United States Patent
Nagahashi et al.

(10) Patent No.: US 12,486,806 B2
(45) Date of Patent: Dec. 2, 2025

(54) OPERATION METHOD FOR GAS TURBINE AND CONTROL DEVICE FOR GAS TURBINE

(71) Applicant: MITSUBISHI HEAVY INDUSTRIES, LTD., Tokyo (JP)

(72) Inventors: Hiroaki Nagahashi, Tokyo (JP); Akinori Hayashi, Tokyo (JP); Hiromi Koizumi, Tokyo (JP); Tomo Kawakami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/029,020

(22) Filed: Jan. 17, 2025

(65) Prior Publication Data

US 2025/0264061 A1    Aug. 21, 2025

(30) Foreign Application Priority Data

Feb. 15, 2024   (JP) .................. 2024-020749

(51) Int. Cl.
| | |
|---|---|
| *F02C 9/28* | (2006.01) |
| *F02C 7/057* | (2006.01) |
| *F02C 7/22* | (2006.01) |
| *F02C 9/26* | (2006.01) |
| *F02C 9/40* | (2006.01) |
| *F02C 9/48* | (2006.01) |
| *F02C 9/52* | (2006.01) |
| *F02C 9/54* | (2006.01) |

(52) U.S. Cl.
CPC ............... *F02C 9/28* (2013.01); *F02C 7/057* (2013.01); *F02C 7/22* (2013.01); *F02C 9/263* (2013.01); *F02C 9/40* (2013.01); *F02C 9/48* (2013.01); *F02C 9/52* (2013.01); *F02C 9/54* (2013.01)

(58) Field of Classification Search
CPC ...... F02C 9/18; F02C 9/20; F02C 9/26; F02C 9/263; F02C 9/28; F02C 9/34; F02C 9/40; F02C 9/48; F02C 9/50; F02C 9/52; F02C 9/54; F02C 7/22; F02C 7/222; F02C 7/228; F02C 7/232; F02C 7/236; F02C 7/057
See application file for complete search history.

(56) References Cited

U.S. PATENT DOCUMENTS

| | | | |
|---|---|---|---|
| 12,188,411 B2 * | 1/2025 | Sonoda | F02C 9/00 |
| 2006/0101814 A1 * | 5/2006 | Saitoh | F23R 3/343 |
| | | | 60/377 |

(Continued)

FOREIGN PATENT DOCUMENTS

| | | | | |
|---|---|---|---|---|
| EP | 2527737 A2 * | 11/2012 | | F23N 1/002 |
| WO | 2022/149540 | 7/2022 | | |
| WO | WO-2022181370 A1 * | 9/2022 | | |

*Primary Examiner* — William H Rodriguez
(74) *Attorney, Agent, or Firm* — Wenderoth, Lind & Ponack, L.L.P.

(57) ABSTRACT

An operation method for a gas turbine according to at least one embodiment of the present disclosure is an operation method for a gas turbine, including: a step of increasing a co-firing ratio of first fuel the co-firing ratio of which is to be increased and second fuel different from the first fuel. The step of increasing the co-firing ratio includes changing at least either of a turbine inlet temperature or a change rate of the co-firing ratio based on information regarding a relationship between the turbine inlet temperature and the co-firing ratio.

20 Claims, 12 Drawing Sheets

(56) References Cited

U.S. PATENT DOCUMENTS

| | | | |
|---|---|---|---|
| 2007/0051109 A1* | 3/2007 | Sonoda | F02C 9/28 |
| | | | 60/773 |
| 2007/0271024 A1* | 11/2007 | Fujii | G05B 13/024 |
| | | | 701/100 |
| 2015/0040571 A1* | 2/2015 | Coomar | F02C 9/28 |
| | | | 60/734 |
| 2016/0326967 A1* | 11/2016 | Yamamoto | F23R 3/28 |
| 2017/0074175 A1* | 3/2017 | Uyama | F02C 9/28 |
| 2017/0089268 A1* | 3/2017 | Uyama | F02C 9/52 |
| 2017/0145925 A1* | 5/2017 | Kusumi | F02C 6/00 |
| 2017/0254282 A1* | 9/2017 | Sonoda | F02C 9/22 |
| 2018/0223743 A1* | 8/2018 | Yamamoto | F02C 9/34 |
| 2018/0283288 A1* | 10/2018 | Ishii | F02C 9/54 |
| 2020/0217252 A1* | 7/2020 | Takaki | F02C 3/04 |
| 2020/0392908 A1* | 12/2020 | Yunoki | F02C 9/28 |
| 2021/0095599 A1* | 4/2021 | Asai | F02C 7/228 |
| 2022/0367890 A1* | 11/2022 | Wang | H01M 8/0494 |
| 2024/0125476 A1 | 4/2024 | Miyamoto et al. | |

\* cited by examiner

OPERATION METHOD FOR GAS TURBINE AND CONTROL DEVICE FOR GAS TURBINE

TECHNICAL FIELD

The present disclosure relates to an operation method for a gas turbine and a control device for the gas turbine.

BACKGROUND

It is known that in a gas turbine, a plurality of types of fuel, such as less combustible fuel and highly combustible fuel, are burned in a combustor by changing the ratio of supply amounts (see, for example, Patent Document 1).

CITATION LIST

Patent Literature

Patent Document 1: WO2022/149540A

SUMMARY

When the plurality of types of fuel are burned by changing the ratio of the supply amounts as in the combustor described in the above-described patent document, the amount of unburned fuel generated may increase during the process of changing the ratio of the supply amounts, depending on the type of combustion. The generation of the unburned fuel leads to a decrease in efficiency in the gas turbine. Therefore, it is desirable to minimize the amount of the unburned fuel generated.

In view of the above, an object of at least one embodiment of the present disclosure is to provide an operation method for a gas turbine and a control device for the gas turbine, which are capable of reducing an increase in amount of unburned fuel generated.

(1) An operation method for a gas turbine according to at least one embodiment of the present disclosure is an operation method for a gas turbine, including: a step of increasing a co-firing ratio of first fuel the co-firing ratio of which is to be increased and second fuel different from the first fuel. The step of increasing the co-firing ratio includes changing at least either of a turbine inlet temperature or a change rate of the co-firing ratio based on information regarding a relationship between the turbine inlet temperature and the co-firing ratio.

(2) An operation method for a gas turbine according to at least one embodiment of the present disclosure is an operation method for a gas turbine, including: a step of increasing a co-firing ratio of first fuel the co-firing ratio of which is to be increased and second fuel different from the first fuel. The gas turbine includes a sensor for detecting unburned fuel of the first fuel in a combustion gas. The step of increasing the co-firing ratio includes changing at least either of a turbine inlet temperature or a change rate of the co-firing ratio, if it is determined that a concentration of the unburned fuel of the first fuel in the combustion gas, which is detected by the sensor, has increased, based on the concentration.

(3) A control device for a gas turbine according to at least one embodiment of the present disclosure is a control device for a gas turbine, including: a co-firing ratio control unit configured to increase a co-firing ratio of first fuel the co-firing ratio of which is to be increased and second fuel different from the first fuel. The co-firing ratio control unit is configured to change at least either of a turbine inlet temperature or a change rate of the co-firing ratio based on information regarding a relationship between the turbine inlet temperature and the co-firing ratio, when the co-firing ratio is increased.

According to at least one embodiment of the present disclosure, it is possible to reduce an increase in amount of unburned fuel generated.

DETAILED DESCRIPTION

Figure 1:
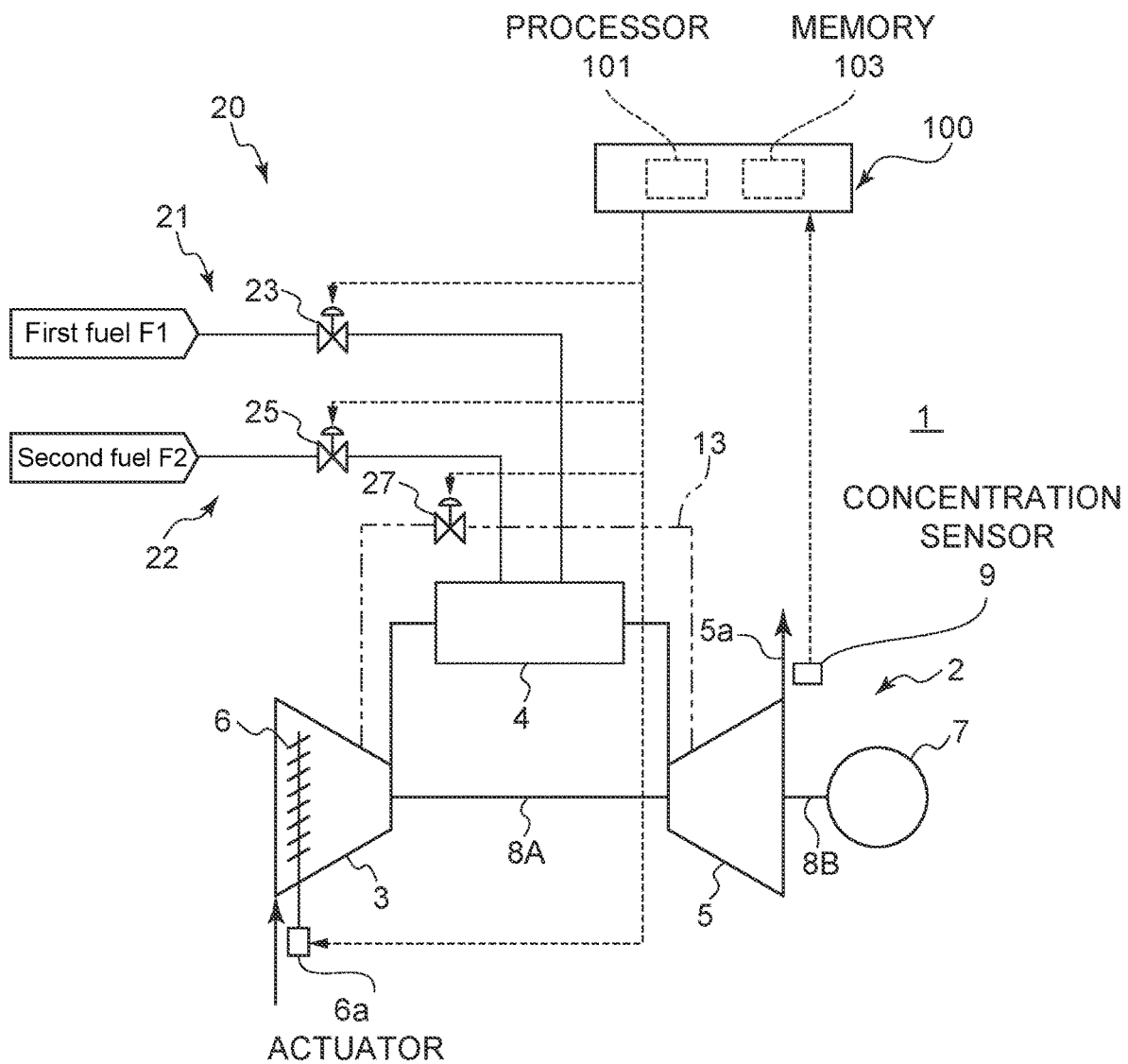
FIG. 1 is a diagram schematically showing the configuration of a gas turbine according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Overall Configuration of Gas Turbine 2

Hereinafter, an example of a gas turbine 2 including a control device 100 for the gas turbine according to some embodiments will be described. FIG. 1 is a diagram schematically showing the configuration of the gas turbine 2 according to an embodiment. As shown in FIG. 1, a power generating apparatus 1 includes the gas turbine 2 and a generator 7.

FIG. 1 mainly illustrates a configuration related to the operation method for the gas turbine, which will be described later, and omits illustration of other configurations.

The gas turbine 2 is, for example, a gas turbine for power generation. The gas turbine 2 includes a compressor 3 for generating compressed air, a combustor 4 for generating a combustion gas from the compressed air and fuel, a turbine 5 configured to rotationally be driven by the combustion gas, and a fuel system 20 for supplying fuel to the combustor 4.

The compressor 3 is connected to the turbine 5 via a rotational shaft 8A. The compressor 3 is rotationally driven by rotational energy of the turbine 5 to generate the compressed air. An inlet guide vane 6 is disposed on an inlet side of the compressor 3. The amount of air inflow is adjusted by changing the opening degree of the inlet guide vane 6 with an actuator 6a. The opening degree of the inlet guide vanes 6 is controlled based on an inlet guide vane opening degree control command IGVCSO. The compressed air generated by the compressor 3 is supplied to the combustor 4.

The combustor 4 is supplied with fuel and the compressed air generated by the compressor 3, and burns the fuel to generate the combustion gas which serves as a working fluid for the turbine 5. In the gas turbine 2 according to an embodiment, first fuel F1 and second fuel F2 different from the first fuel F1 can be burned in the combustor 4.

The turbine 5 is driven by the combustion gas generated by the combustor 4. The turbine 5 is connected to the generator 7 by a rotational shaft 8B. The generator 7 is configured to generate electricity by the rotational energy of the turbine 5.

A concentration sensor 9 for detecting the concentration of ammonia in the combustion gas is disposed in an exhaust passage 5a of the turbine 5.

Fuel System 20

In the gas turbine 2 according to an embodiment, the fuel system 20 is configured to supply as fuel the first fuel F1 and the second fuel F2 different from the first fuel F1 to the combustor 4. The fuel system 20 according to an embodiment includes a first fuel supply system 21 for supplying the first fuel F1 to the combustor 4, and a second fuel supply system 22 for supplying the second fuel F2 to the combustor 4.

In the gas turbine 2 according to an embodiment, the first fuel F1 is, for example, ammonia, and the second fuel F2 is, for example, natural gas, but the first fuel F1 may be other than ammonia, and the second fuel F2 may be other than natural gas as long as the second fuel F2 is fuel different from the first fuel F1.

The first fuel supply system 21 of the fuel system 20 according to an embodiment includes a first fuel flow control valve 23 for controlling the amount of the first fuel F1 supplied to the combustor 4.

The second fuel supply system 22 of the fuel system 20 according to an embodiment includes a second fuel flow control valve 25 for controlling the amount of the second fuel F2 supplied to the combustor 4.

The first fuel flow control valve 23 has an actuator (not shown) for controlling the flow rate of the first fuel F1 flowing in the first fuel flow control valve 23. Likewise, the second fuel flow control valve 25 has an actuator (not shown) for controlling the flow rate of the second fuel F2 flowing in the second fuel flow control valve 25.

In the fuel system 20 according to an embodiment, the actuators (not shown) of the first fuel flow control valve 23 and the second fuel flow control valve 25 are controlled by the control device 100 according to some embodiments.

Control Device 100

The control device 100 according to some embodiments includes a processor 101 for executing various types of arithmetic processing, and a memory 103 for non-temporarily or temporarily storing various data processed by the processor 101. The processor 101 is implemented by CPU, GPU, MPU, DSP, various kinds of computation devices other than these, a combination of these, or the like. The memory 103 is implemented by ROM, RAM, flash memory, a combination of these, or the like.

Figure 2:
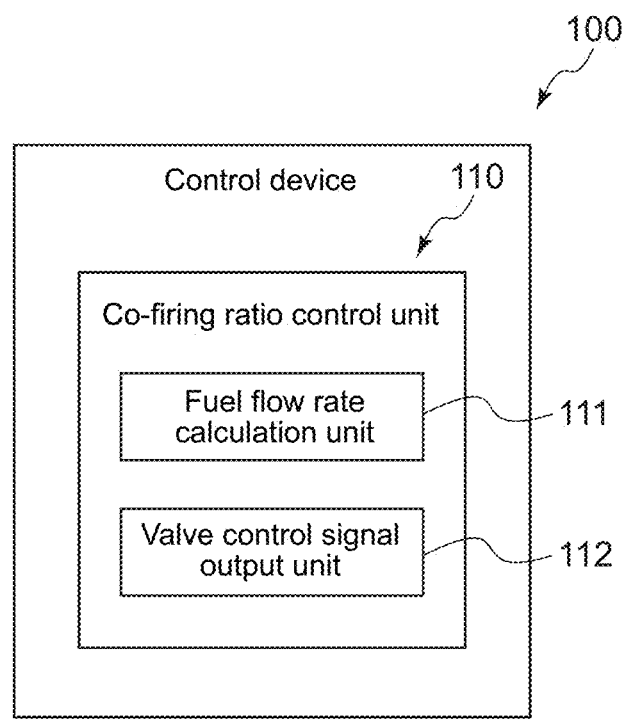
FIG. 2 is a functional block diagram of a control device according to some embodiments.

FIG. 2 is a functional block diagram of the control device 100 according to some embodiments. FIG. 2 illustrates only functional blocks related to the control of the flow rates of the first fuel F1 and the second fuel F2, which will be described later, and omits illustration of other functional blocks.

The control device 100 according to some embodiments includes a co-firing ratio control unit 110 configured to increase the co-firing ratio of the first fuel F1 the co-firing ratio of which is to be increased and the second fuel F2 different from the first fuel F1. The co-firing ratio control unit 110 includes a fuel flow rate calculation unit 111 and a valve control signal output unit 112. The co-firing ratio control unit 110, the fuel flow rate calculation unit 111, and the valve control signal output unit 112 are functional blocks implemented by the processor 101 executing the programs stored in the memory 103.

The fuel flow rate calculation unit 111 calculates the flow rates of the first fuel F1 and the second fuel F2, which are supplied to the combustor 4 from the first fuel supply system 21 and the second fuel supply system 22, as described later.

The valve control signal output unit 112 outputs control signals to the actuators (not shown) of the first fuel flow control valve 23 and the second fuel flow control valve 25 such that the first fuel F1 and the second fuel F2 are supplied to the combustor 4 at the flow rates calculated by the fuel flow rate calculation unit 111.

In the control device 100 according to some embodiments, when the above-described co-firing ratio is increased, the co-firing ratio control unit 110 is configured to change at least either of a turbine inlet temperature T1T or the change rate of the co-firing ratio based on information regarding the relationship between the turbine inlet temperature T1T and the above-described co-firing ratio, as described later.

Specific processing contents in the control device 100 will be described in detail later.

As to Control of Co-Firing Ratio

In some embodiments, the gas turbine 2 is started by single-firing of natural gas, i.e., the second fuel F2. Then, after the turbine inlet temperature T1T reaches a target temperature, the fuel supplied to the combustor 4 is switched to single-firing of the first fuel F1 by increasing the first fuel F1 while decreasing the second fuel F2.

That is, in the gas turbine 2 according to some embodiments, during the period from when the gas turbine 2 is started by single-firing of the second fuel F2 and the turbine inlet temperature T1T reaches the target temperature to when single-firing of the first fuel F1 is switched to, the co-firing ratio (calorie ratio) of the first fuel F1 to total fuel supplied to the combustor 4 is gradually increased from 0% to 100%. In the present disclosure, the co-firing ratio (calorie ratio) of the first fuel F1 to the total fuel supplied to the combustor 4 is also simply referred to as the co-firing ratio.

Figure 3:
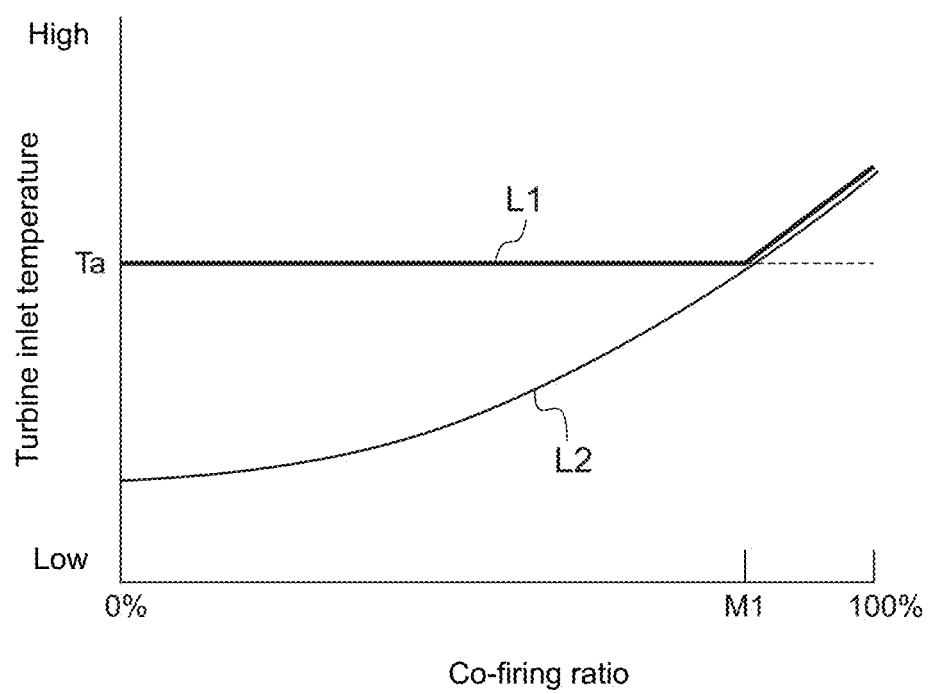
FIG. 3 is a graph for describing a relationship between a turbine inlet temperature and the co-firing ratio.

FIG. 3 is a graph for describing a relationship between the turbine inlet temperature and the co-firing ratio, and the horizontal axis represents the co-firing ratio and the vertical axis represents the turbine inlet temperature T1T.

A thin solid graph line L2 shown in FIG. 3 is a graph line indicating a boundary as to whether unburned fuel of ammonia, which is the first fuel F1 in the combustion gas, is generated. In the following description, the unburned fuel of the first fuel F1 in the combustion gas is also simply referred to as unburned fuel, and the concentration of the unburned fuel of the first fuel F1 in the combustion gas is also simply referred to as the concentration of the unburned fuel.

A region on a lower right side of the graph line L2 in FIG. 3 is a region where the unburned fuel is generated, and a region on an upper left side of the graph line L2 in FIG. 3 is a region where the unburned fuel is not generated. Further, in the region on the lower right side of the graph line L2 in FIG. 3, the concentration of the unburned fuel increases as a distance from the graph line L2 increases.

The graph line L2 is a graph line obtained in advance by a testing, etc.

As described above, as a result of intensive studies by the present inventors, it was found that the relationship between the turbine inlet temperature T1T and the co-firing ratio influences the concentration of the unburned fuel.

For example, as indicated by a thick solid graph line L1 in the graph of FIG. 3, if the co-firing ratio is increased while the turbine inlet temperature T1T is maintained at a temperature Ta, the graph line L1 contacts the graph line L2 when the co-firing ratio reaches a value M1.

Herein, if the co-firing ratio is further increased while the turbine inlet temperature T1T is maintained at the temperature Ta, the graph line L1 reaches the region on the lower right side of the graph line L2, as indicated by a dashed line. Therefore, if the co-firing ratio exceeds the value M1 when the turbine inlet temperature T1T is at the temperature Ta, the unburned fuel is generated, and the concentration thereof gradually increases as the co-firing ratio increases.

As a result of intensive studies by the present inventors, it was found that if an increase in amount of the unburned fuel generated is expected in the process of increasing the co-firing ratio as described above, the increase in amount of the unburned fuel generated can be reduced by increasing the turbine inlet temperature T1T or decreasing the change rate of the co-firing ratio.

Therefore, in the operation method for the gas turbine according to some embodiments, in the process of increasing the co-firing ratio, at least either of the turbine inlet temperature T1T or the change rate of the co-firing ratio is changed based on the information regarding the relationship between the turbine inlet temperature T1T and the co-firing ratio as shown in the graph of FIG. 3, as described later.

Whereby, it is possible to reduce the increase in amount of the unburned fuel generated.

The information regarding the relationship between the turbine inlet temperature T1T and the co-firing ratio as shown in the graph of FIG. 3 is assumed to be stored in advance in the memory 103 of the control device 100.

The information regarding the relationship between the turbine inlet temperature T1T and the co-firing ratio as shown in the graph of FIG. 3 may be a map of the turbine inlet temperature T1T and the co-firing ratio as shown in the graph of FIG. 3.

Whereby, it is relatively easy to control the turbine inlet temperature T1T or the change rate of the co-firing ratio.

Since the concentration of the unburned fuel increases as the distance from the graph line L2 of FIG. 3 increases in the region on the lower right side of the graph line L2 as described above, the information regarding the relationship between the turbine inlet temperature T1T and the co-firing ratio as shown in the graph of FIG. 3 is also information regarding a relationship among the turbine inlet temperature T1T, the co-firing ratio, and the concentration of the unburned fuel.

Further, the information regarding the relationship between the turbine inlet temperature T1T and the co-firing ratio as shown in the graph of FIG. 3 may be a function regarding the relationship among the turbine inlet temperature T1T, the co-firing ratio, and the concentration of the unburned fuel.

Therefore, in the operation method for the gas turbine according to some embodiments, the increase in amount of the unburned fuel generated can be reduced by changing at least either of the turbine inlet temperature T1T or the change rate of the co-firing ratio based on the information regarding the relationship among the turbine inlet temperature T1T, the co-firing ratio, and the concentration of the unburned fuel as shown in the graph of FIG. 3.

Figure 4:
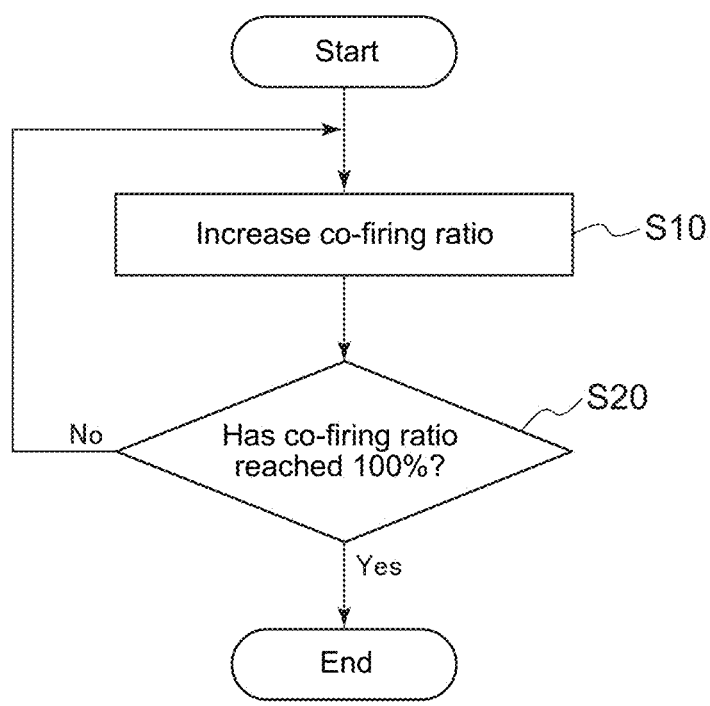
FIG. 4 is a flowchart showing a processing procedure in an operation method for the gas turbine according to some embodiments.

FIG. 4 is a flowchart showing a processing procedure in the operation method for the gas turbine according to some embodiments. In the operation method for the gas turbine according to some embodiments, when the gas turbine 2 is started by single-firing of the second fuel F2 and the turbine inlet temperature T1T reaches the target temperature, the processor 101 of the control device 100 reads from the memory 103 the program for executing a process shown in the flowchart of FIG. 4 and executes the program.

The operation method for the gas turbine according to some embodiments includes step S10 of increasing the co-firing ratio.

In the operation method for the gas turbine according to some embodiments, step S10 of increasing the co-firing ratio is a step of increasing the co-firing ratio of the first fuel F1 the co-firing ratio of which is to be increased and the second fuel F2 different from the first fuel F1.

Hereinafter, processing contents in step S10 of increasing the co-firing ratio will be described.

As to Operation Method for Gas Turbine in First Embodiment

Figure 5A:
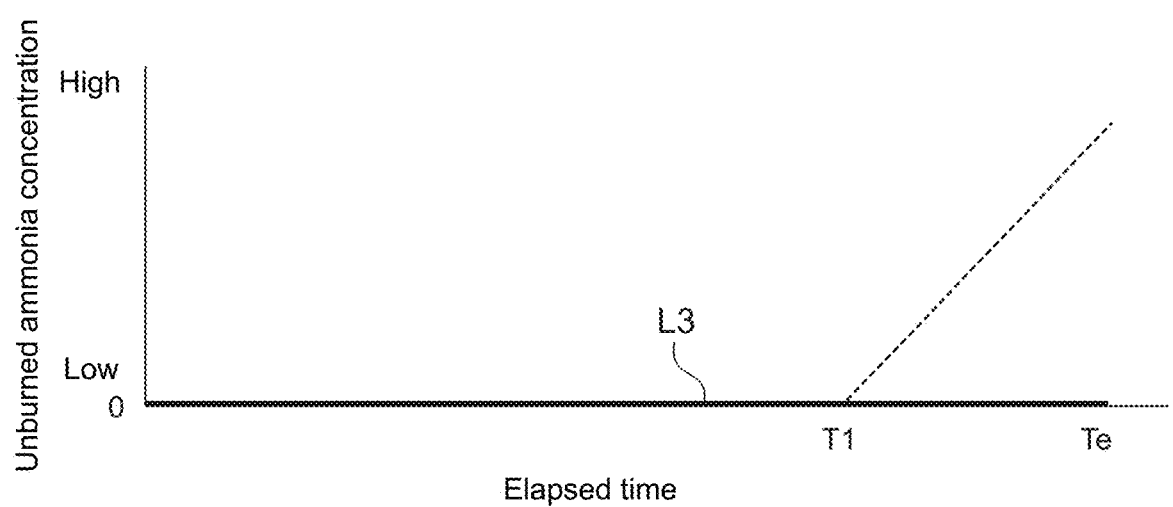
FIG. 5A is a graph showing a transition of an unburned ammonia concentration during execution of a step of increasing the co-firing ratio in the operation method for the gas turbine according to the first embodiment.

FIG. 5A is a graph showing a transition of the concentration of the unburned fuel, i.e., an unburned ammonia concentration during execution of step S10 of increasing the co-firing ratio in the operation method for the gas turbine according to the first embodiment.

Figure 5B:
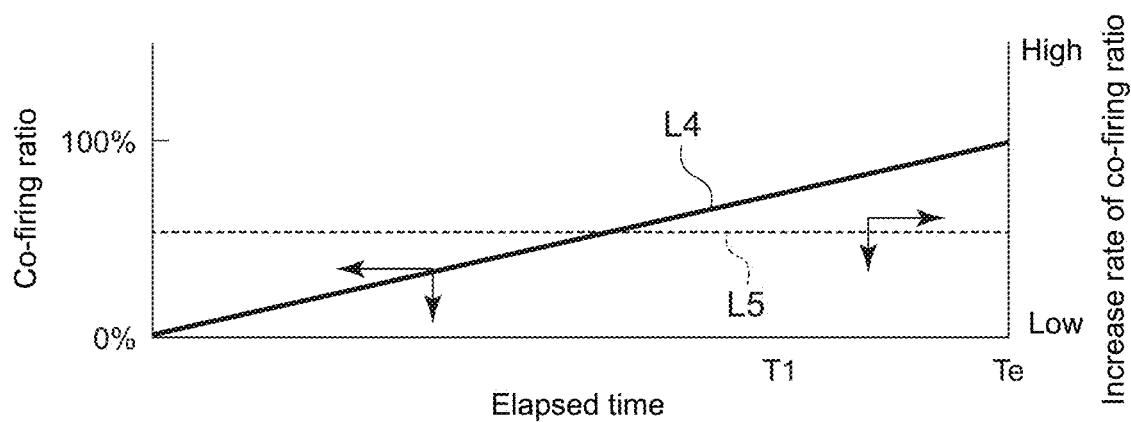
FIG. 5B is a graph showing a transition of the co-firing ratio during the execution of the step of increasing the co-firing ratio and a transition of the increase rate of the co-firing ratio in the operation method for the gas turbine according to the first embodiment.

FIG. 5B is a graph showing a transition of the co-firing ratio during the execution of step S10 of increasing the co-firing ratio and a transition of the increase rate of the co-firing ratio in the operation method for the gas turbine according to the first embodiment.

Figure 5C:
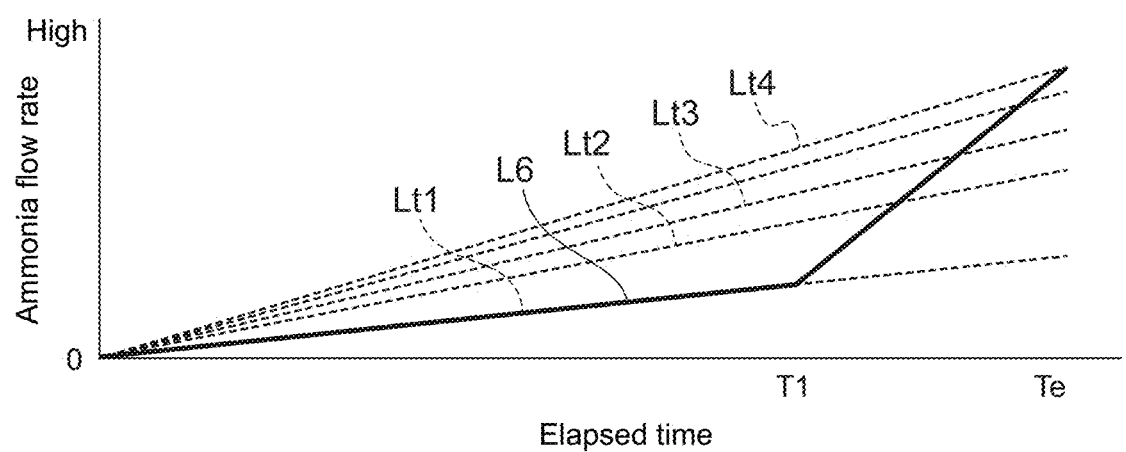
FIG. 5C is a graph showing a transition of an ammonia flow rate during the execution of the step of increasing the co-firing ratio in the operation method for the gas turbine according to the first embodiment.

FIG. 5C is a graph showing a transition of an ammonia flow rate which is the amount of the first fuel F1 supplied to the combustor 4 during the execution of step S10 of increasing the co-firing ratio in the operation method for the gas turbine according to the first embodiment.

Figure 5D:
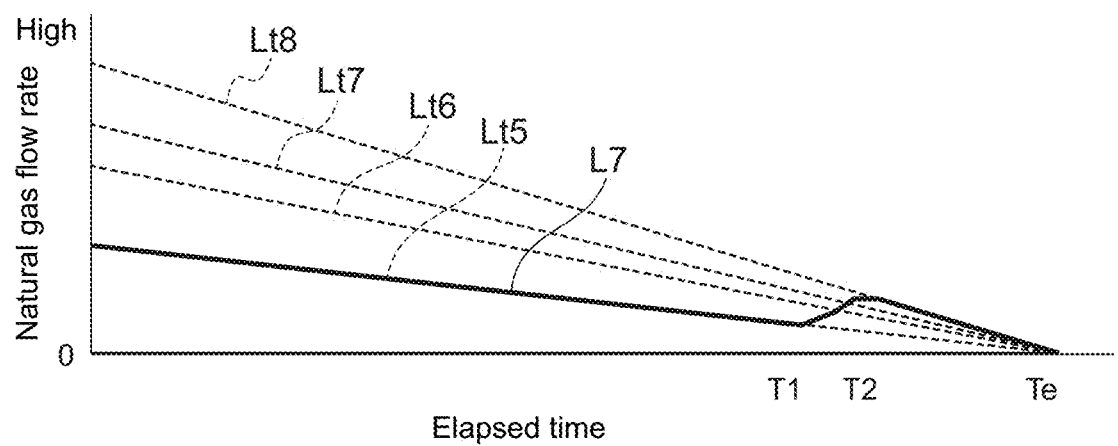
FIG. 5D is a graph showing a transition of a natural gas flow rate during the execution of the step of increasing the co-firing ratio in the operation method for the gas turbine according to the first embodiment.

FIG. 5D is a graph showing a transition of a natural gas flow rate which is the amount of the second fuel F2 supplied to the combustor 4 during the execution of step S10 of increasing the co-firing ratio in the operation method for the gas turbine according to the first embodiment.

Figure 5E:
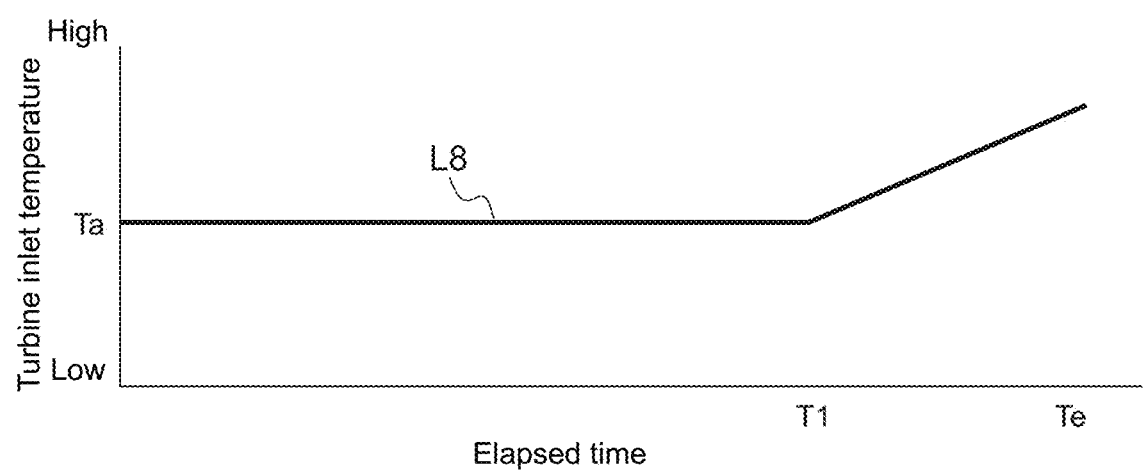
FIG. 5E is a graph showing a transition of the turbine inlet temperature during the execution of the step of increasing the co-firing ratio in the operation method for the gas turbine according to the first embodiment.

FIG. 5E is a graph showing a transition of the turbine inlet temperature T1T during the execution of step S10 of increasing the co-firing ratio in the operation method for the gas turbine according to the first embodiment.

In the operation method for the gas turbine according to the first embodiment, as described below, in step S10 of increasing the co-firing ratio, the turbine inlet temperature T1T is changed so that the concentration of the unburned fuel in the combustion gas does not exceed a specified concentration, based on the information regarding the relationship between the turbine inlet temperature T1T and the co-firing ratio as shown in the graph of FIG. 3.

In the operation method for the gas turbine according to the first embodiment, in step S10 of increasing the co-firing ratio, the co-firing ratio control unit 110 of the control device 100 increases the co-firing ratio with the increase rate of the co-firing ratio at a certain constant increase rate from the start to the end of the execution of step S10 of increasing the co-firing ratio, i.e., from the co-firing ratio of 0% to 100%, as indicated by graph lines L4 and L5 in FIG. 5B.

Further, in the operation method for the gas turbine according to the first embodiment, it is assumed that the co-firing ratio reaches 100% when a time Te has elapsed since the start of the execution of step S10.

For the descriptive convenience, it is assumed that the turbine inlet temperature T1T at the start of step S10 of increasing the co-firing ratio is the temperature Ta in FIG. 3.

In the operation method for the gas turbine according to the first embodiment, in step S10 of increasing the co-firing ratio, the fuel flow rate calculation unit 111 of the control device 100 calculates the flow rates of the first fuel F1 and the second fuel F2, which are supplied from the first fuel supply system 21 and the second fuel supply system 22 to the combustor 4, such that the co-firing ratio increases at a constant increase rate of the co-firing ratio while the turbine inlet temperature T1T is maintained at the temperature Ta as indicated by a graph line L8 in FIG. 5E. Then, the valve control signal output unit 112 of the control device 100 outputs the control signals to the actuators (not shown) of the first fuel flow control valve 23 and the second fuel flow control valve 25 such that the first fuel F1 and the second fuel F2 are supplied to the combustor 4 at the flow rates calculated by the fuel flow rate calculation unit 111.

As a result, the ammonia flow rate, which is the amount of the first fuel F1 supplied to the combustor 4, gradually increases with the elapse of time as indicated by a graph line L6 in FIG. 5C, and the natural gas flow rate, which is the amount of the second fuel F2 supplied to the combustor 4, gradually decreases with the elapse of time as shown in FIG. 5D.

Consequently, in the turbine 5, the co-firing ratio increases at the constant increase rate of the co-firing ratio while the turbine inlet temperature T1T is maintained at the temperature Ta.

Dashed graph lines Lt1, Lt2, Lt3, and Lt4 in FIG. 5C are respectively graph lines representing transitions of the ammonia flow rate when the co-firing ratio is increased with the increase rate of the co-firing ratio at a certain constant increase rate while the turbine inlet temperature T1T is maintained at a certain temperature. The turbine inlet temperature T1T is maintained at different temperatures in the graph lines Lt1, Lt2, Lt3, and Lt4, respectively, and the higher the graph line in FIG. 5C, the higher the maintained turbine inlet temperature T1T.

Dashed graph lines Lt5, Lt6, Lt7, and Lt8 in FIG. 5D are respectively graph lines representing transitions of the natural gas rate when the co-firing ratio is increased with the increase rate of the co-firing ratio at a certain constant increase rate while the turbine inlet temperature T1T is maintained at a certain temperature. The turbine inlet temperature T1T is maintained at different temperatures in the graph lines Lt5, Lt6, Lt7, and Lt8, respectively, and the higher the graph line in FIG. 5D, the higher the maintained turbine inlet temperature T1T.

In the operation method for the gas turbine according to the first embodiment, it is assumed that the graph line L1 in FIG. 3 contacts the graph line L2 shortly after time T1 has elapsed since the start of the execution of step S10 of increasing the co-firing ratio. That is, in the operation method for the gas turbine according to the first embodiment, it is assumed that when step S10 of increasing the co-firing ratio is executed while the turbine inlet temperature T1T is maintained at the temperature Ta, the co-firing ratio reaches the value M1 in FIG. 3 shortly after the time T1 has elapsed from the start of the execution of step S10. Therefore, shortly after the time T1 has elapsed, the unburned fuel begins to be generated as indicated by a dashed line portion of a graph line L3 in FIG. 5A.

Therefore, in the operation method for the gas turbine according to the first embodiment, in step S10 of increasing the co-firing ratio, the fuel flow rate calculation unit 111 calculates the flow rates of the first fuel F1 and the second fuel F2, which are supplied from the first fuel supply system 21 and the second fuel supply system 22 to the combustor 4, such that the turbine inlet temperature T1T is gradually increased so that the unburned fuel does not exceed the specified concentration. Then, the valve control signal output unit 112 of the control device 100 outputs the control signals to the actuators (not shown) of the first fuel flow control valve 23 and the second fuel flow control valve 25 such that the first fuel F1 and the second fuel F2 are supplied to the combustor 4 at the flow rates calculated by the fuel flow rate calculation unit 111.

In the operation method for the gas turbine according to the first embodiment, each unit is controlled such that the graph line L1 in FIG. 3 remains in the upper left region of the graph line L2.

In the operation method for the gas turbine according to the first embodiment, in step S10 of increasing the co-firing ratio, the co-firing ratio control unit 110 of the control device 100 controls the turbine inlet temperature T1T such that the turbine inlet temperature T1T becomes a first temperature, for example, if it is determined that the concentration of the unburned fuel does not exceed the specified concentration as before the elapse of the time T1, based on the information regarding the relationship between the turbine inlet temperature T1T and the co-firing ratio as shown in the graph of FIG. 3. In step S10 of increasing the co-firing ratio, the co-firing ratio control unit 110 of the control device 100 preferably controls the turbine inlet temperature T1T such that the turbine inlet temperature T1T becomes a second temperature higher than the first temperature, for example, if it is determined that the concentration of the unburned fuel is about to exceed the specified concentration as after the elapse of the time T1, based on the above-described information.

The above-described first temperature may be, for example, the temperature Ta indicated by the graph line L1 in FIG. 3 when the co-firing ratio is lower than the value M1. The above-described second temperature may be, for example, the temperature indicated by the graph line L1 in FIG. 3 when the co-firing ratio is higher than the value M1.

The first temperature and the second temperature, which are described above, may be fixed values or variable values.

In the operation method for the gas turbine according to the first embodiment, the turbine inlet temperature T1T can gradually be increased by, for example, performing the above-described control.

Further, with the operation method for the gas turbine according to the first embodiment, by increasing the turbine inlet temperature T1T, it is possible to prevent the concentration of the unburned fuel in the combustion gas from exceeding the specified concentration as shown by a solid line portion of the graph line L3 in FIG. 5A.

The solid line portion of the graph line L3 in FIG. 5A is represented as a state in which no unburned fuel is generated. However, the solid line portion of the graph line L3 may be located in a region where the concentration is not greater than the specified concentration.

In the operation method for the gas turbine according to the first embodiment, the graph line L1 may remain in the region on the upper left side of the graph line L2 even after the co-firing ratio reaches the value M1 as described above. The same also applies to the operation method for the gas turbine according to the second embodiment, which will be described later.

Whereby, before the co-firing ratio reaches the value M1 in FIG. 3, the turbine inlet temperature T1T increases as the co-firing ratio increases as indicated by the graph line L1, and the graph line L1 is present in the region on the upper left side of the graph line L2 even after the co-firing ratio reaches the value M1, making it possible to prevent the generation of the unburned fuel.

In the operation method for the gas turbine according to the first embodiment, after the co-firing ratio reaches the value M1, even if the graph line L1 is present in the region on the lower right side of the graph line L2, the turbine inlet temperature T1T is preferably changed so that the graph line L1 does not enter a region where the concentration of the unburned fuel is relatively high, i.e., so that the graph line L1 does not enter a region relatively away from the graph line L2. The same also applies to the operation method for the gas turbine according to the second embodiment, which will be described later.

Whereby, it is possible to reduce the increase in amount of the unburned fuel generated.

As an example of gradually increasing the turbine inlet temperature T1T, in the operation method for the gas turbine according to the first embodiment, the co-firing ratio control unit 110 controls each unit such that an increase speed Sam of the flow rate of the first fuel F1 becomes a first increase speed Sam1 before the time T1 has elapsed and controls each unit such that the increase speed Sam of the flow rate of the first fuel F1 becomes a second increase speed Sam2 greater than the first increase speed Sam1 after the time T1 has elapsed, for example.

Consequently, the ammonia flow rate which is the amount of the first fuel F1 supplied to the combustor 4 increases at the greater increase speed after the time T1 has elapsed than before the time T1 has elapsed, as shown in FIG. 5C. Therefore, it is possible to gradually increase the turbine inlet temperature T1T, and it is possible to prevent the concentration of the unburned fuel in the combustion gas from exceeding the specified concentration.

Further, as an example of gradually increasing the turbine inlet temperature T1T, in the operation method for the gas turbine according to the first embodiment, the co-firing ratio control unit 110 controls each unit such that a decrease speed Sng of the flow rate of the second fuel F2 becomes a first decrease speed Sng1 before the time T1 has elapsed and controls each unit such that the decrease speed Sng of the flow rate of the second fuel F2 becomes a second decrease speed Sng2 less than the first decrease speed Sng1 after the time T1 has elapsed, for example.

Consequently, the natural gas flow rate which is the amount of the second fuel F2 supplied to the combustor 4 decreases at the less decrease speed after the time T1 has elapsed than before the time T1 has elapsed, as indicated by a graph line L7 in FIG. 5D. Therefore, it is possible to gradually increase the turbine inlet temperature T1T, and it is possible to prevent the concentration of the unburned fuel in the combustion gas from exceeding the specified concentration.

In the operation method for the gas turbine according to the first embodiment, the second decrease speed Sng2 less than the first decrease speed Sng1 can also become a negative value, such as in a period from the time T1 to time T2 in FIG. 5D, and can also temporarily increase with the elapse of time. However, even if the second decrease speed Sng2 becomes the negative value, it is desirable that at least the increase rate of the co-firing ratio becomes a positive value, and in the operation method for the gas turbine according to the first embodiment, it is desirable that the increase rate of the co-firing ratio maintains a constant value.

The control of changing the increase speed Sam of the flow rate of the first fuel F1 from the first increase speed Sam1 to the second increase speed Sam2 after the time T1 has elapsed and the control of changing the decrease speed Sng of the flow rate of the second fuel F2 from the first decrease speed Sng1 to the second decrease speed Sng2 after the time T1 has elapsed, which are described above, may be performed simultaneously, or only either of them may be performed.

When the increase speed Sam of the flow rate of the first fuel F1 and the decrease speed Sng of the flow rate of the second fuel F2 are controlled, the increase rate of the co-firing ratio may be maintained at a certain constant increase rate.

That is, in step S10 of increasing the co-firing ratio, the co-firing ratio control unit 110 of the control device 100 preferably sets the increase speed Sam of the flow rate of the first fuel F1 to the first increase speed Sam1 and sets the decrease speed Sng of the flow rate of the second fuel F2 to the first decrease speed Sng1 such that the turbine inlet temperature T1T becomes the first temperature while the change rate of the co-firing ratio is maintained at a first change rate, if it is determined that the concentration of the unburned fuel does not exceed the specified concentration, based on the information regarding the relationship between the turbine inlet temperature T1T and the co-firing ratio as shown in the graph of FIG. 3. In step S10 of increasing the co-firing ratio, the co-firing ratio control unit 110 of the control device 100 preferably sets the increase speed Sam of the flow rate of the first fuel F1 to the second increase speed Sam2 greater than the first increase speed Sam1 and sets the decrease speed Sng of the flow rate of the second fuel F2 to the second decrease speed Sng2 less than the first decrease speed Sng1 such that the turbine inlet temperature T1T becomes the second temperature higher than the above-described first temperature while the change rate of the co-firing ratio is maintained at the above-described first change rate, if it is determined that the concentration of the unburned fuel is about to exceed the specified concentration, based on the above-described information.

With the operation method for the gas turbine according to the first embodiment, it is possible to prevent the concentration of the unburned fuel in the combustion gas from exceeding the specified concentration without changing the change rate of the co-firing ratio.

In the operation method for the gas turbine according to the first embodiment described above, the turbine inlet temperature T1T is gradually increased while increasing the co-firing ratio with the increase rate of the co-firing ratio maintained at the certain constant increase rate. However, the turbine inlet temperature T1T may gradually be increased while increasing the co-firing ratio despite the variation in increase rate of the co-firing ratio.

After step S10 of increasing the co-firing ratio is executed, the process proceeds to step S20 in which the co-firing ratio control unit 110 determines whether the co-firing ratio has reached 100%. If the co-firing ratio control unit 110 determines that the co-firing ratio has not reached 100%, the process returns to step S10.

If the co-firing ratio control unit 110 determines that the co-firing ratio has reached 100%, the process in this program ends.

As to Operation Method for Gas Turbine in Second Embodiment

In the operation method for the gas turbine according to the first embodiment described above, the increase speed Sam of the flow rate of the first fuel F1 and the decrease speed Sng of the flow rate of the second fuel F2 are changed in order to increase the turbine inlet temperature T1T.

In the operation method for the gas turbine according to the second embodiment, the opening degree of the inlet guide vanes 6 is reduced in order to increase the turbine inlet temperature T1T.

In the operation method for the gas turbine according to the second embodiment, in step S10 of increasing the co-firing ratio, the control device 100 controls each unit such that the opening degree of the inlet guide vane 6 becomes a first opening degree so that the turbine inlet temperature T1T becomes the first temperature, for example, if it is determined that the concentration of the unburned fuel does not exceed the specified concentration as before the elapse of the time T1, based on the information regarding the relationship between the turbine inlet temperature T1T and the co-firing ratio as shown in the graph of FIG. 3. That is, the control device 100 calculates the opening degree (first opening degree) of the inlet guide vane 6 such that the turbine inlet temperature T1T becomes the first temperature, and outputs a control signal to the actuator 6a such that the calculated opening degree (first opening degree) is obtained, if it is determined that the concentration of the unburned fuel does not exceed the specified concentration.

In the operation method for the gas turbine according to the second embodiment, in step S10 of increasing the co-firing ratio, the control device 100 controls each unit such that the opening degree of the inlet guide vane 6 becomes a second opening degree less than the first opening degree such that the turbine inlet temperature T1T becomes the second temperature higher than the first temperature, for example, if it is determined that the concentration of the unburned fuel is about to exceed the specified concentration as after the elapse of the time T1, based on the above-described information. That is, the control device 100 calculates the opening degree (second opening degree) of the inlet guide vane 6 such that the turbine inlet temperature T1T becomes the second temperature, and outputs a control signal to the actuator 6a such that the calculated opening degree (second opening degree) is obtained, if it is determined that the concentration of the unburned fuel is about to exceed the specified concentration.

With the operation method for the gas turbine according to the second embodiment, it is possible to prevent the concentration of the unburned fuel in the combustion gas from exceeding the specified concentration by changing the opening degree of the inlet guide vane 6.

In the operation method for the gas turbine according to the second embodiment, as described in the operation method for the gas turbine according to the first embodiment described above, the increase speed Sam of the flow rate of the first fuel F1 and the decrease speed Sng of the flow rate of the second fuel F2 may also be changed in order to increase the turbine inlet temperature T1T.

As a method for performing control such that the turbine inlet temperature T1T becomes the second temperature, it is also possible to reduce the amount of air flowing into the combustor 4, by extracting air from the compressor 3. In this case, the extracted air may be used for cooling of the turbine 5, etc., via an extracted air line 13 indicated by a double-dotted chain line in FIG. 1, for example. Whereby, it is possible to prevent the concentration of the unburned fuel in the combustion gas from exceeding the specified concentration.

Specifically, the flow rate of the air flowing into the combustor 4 may be changed by adjusting the opening degree of an extracted air flow control valve 27 disposed in the extracted air line 13 shown in FIG. 1 and configured to control the flow rate of the compressed air (extracted air) flowing in the extracted air line 13, for example.

For example, in the operation method for the gas turbine according to the second embodiment, in step S10 of increasing the co-firing ratio, the control device 100 controls each unit such that the opening degree of the extracted air flow control valve 27 becomes a first opening degree such that the turbine inlet temperature T1T becomes the first temperature, for example, if it is determined that the concentration of the unburned fuel does not exceed the specified concentration as before the elapse of the time T1, based on the information regarding the relationship between the turbine inlet temperature T1T and the co-firing ratio as shown in the graph of FIG. 3. That is, the control device 100 calculates the opening degree (first opening degree) of the extracted air flow control valve 27 such that the turbine inlet temperature T1T becomes the first temperature, and outputs a control signal to an actuator (not shown) of the extracted air flow control valve 27 such that the calculated opening degree (first opening degree) is obtained, if it is determined that the concentration of the unburned fuel does not exceed the specified concentration.

In the operation method for the gas turbine according to the second embodiment, in step S10 of increasing the co-firing ratio, the control device 100 controls each unit such that the opening degree of the extracted air flow control valve 27 becomes a second opening degree greater than the first opening degree such that the turbine inlet temperature T1T becomes the second temperature higher than the first temperature, for example, if it is determined that the concentration of the unburned fuel is about to exceed the specified concentration as after the elapse of the time T1, based on the above-described information. That is, the control device 100 calculates the opening degree (second opening degree) of the extracted air flow control valve 27 such that the turbine inlet temperature T1T becomes the second temperature, and outputs a control signal to the actuator (not shown) of the extracted air flow control valve 27 such that the calculated opening degree (second opening degree) is obtained, if it is determined that the concentration of the unburned fuel is about to exceed the specified concentration.

The first opening degree and the second opening degree of the extracted air flow control valve 27 are irrelevant to the first opening degree and the second opening degree of the inlet guide vane 6, which are described above. The first opening degree of the extracted air flow control valve 27 can also include a case where the extracted air flow control valve 27 is fully closed.

With the operation method for the gas turbine according to the second embodiment, it is possible to prevent the concentration of the unburned fuel in the combustion gas from exceeding the specified concentration by changing the opening degree of the extracted air flow control valve 27.

As to Operation Method for Gas Turbine in Third Embodiment

In the operation methods for the gas turbine according to the first embodiment and the second embodiment described above, the increase in amount of the unburned fuel generated is reduced by increasing the turbine inlet temperature T1T.

In the operation method for the gas turbine according to the third embodiment, the increase in amount of the unburned fuel generated is reduced by decreasing the increase rate of the co-firing ratio.

Figure 6A:
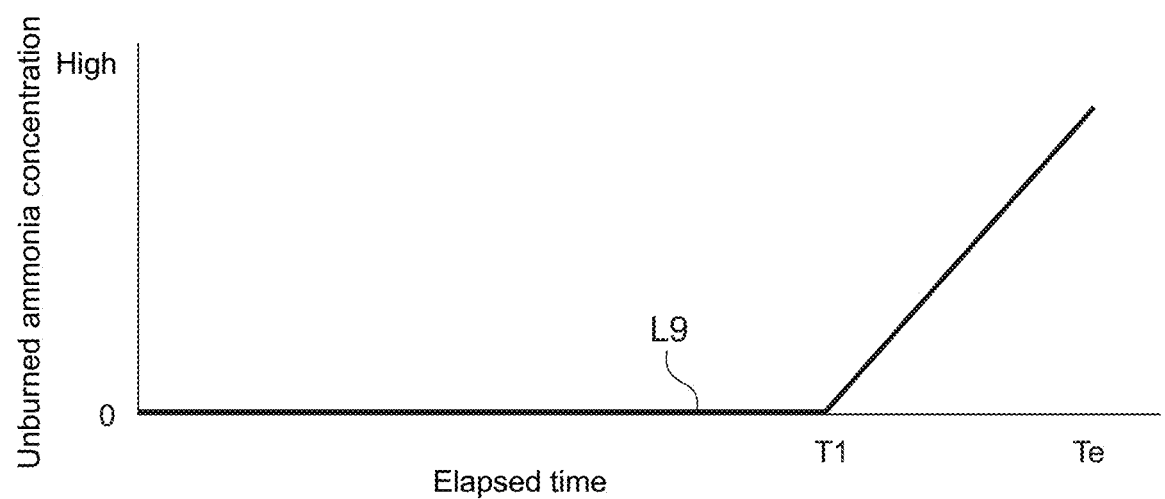
FIG. 6A is a graph showing a transition of the unburned ammonia concentration during the execution of the step of increasing the co-firing ratio in the operation method for the gas turbine according to the third embodiment.

FIG. 6A is a graph showing a transition of the concentration of the unburned fuel, i.e., an unburned ammonia concentration during execution of step S10 of increasing the co-firing ratio in the operation method for the gas turbine according to the third embodiment.

Figure 6B:
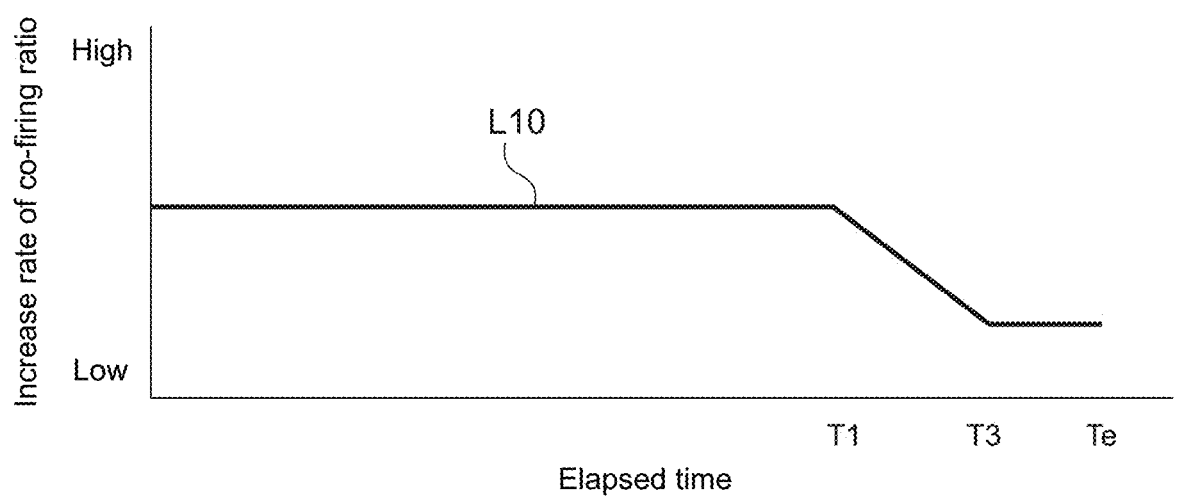
FIG. 6B is a graph showing a transition of the increase rate of the co-firing ratio during the execution of the step of increasing the co-firing ratio in the operation method for the gas turbine according to the third embodiment.

FIG. 6B is a graph showing a transition of the increase rate of the co-firing ratio during the execution of step S10 of increasing the co-firing ratio in the operation method for the gas turbine according to the third embodiment.

Figure 6C:
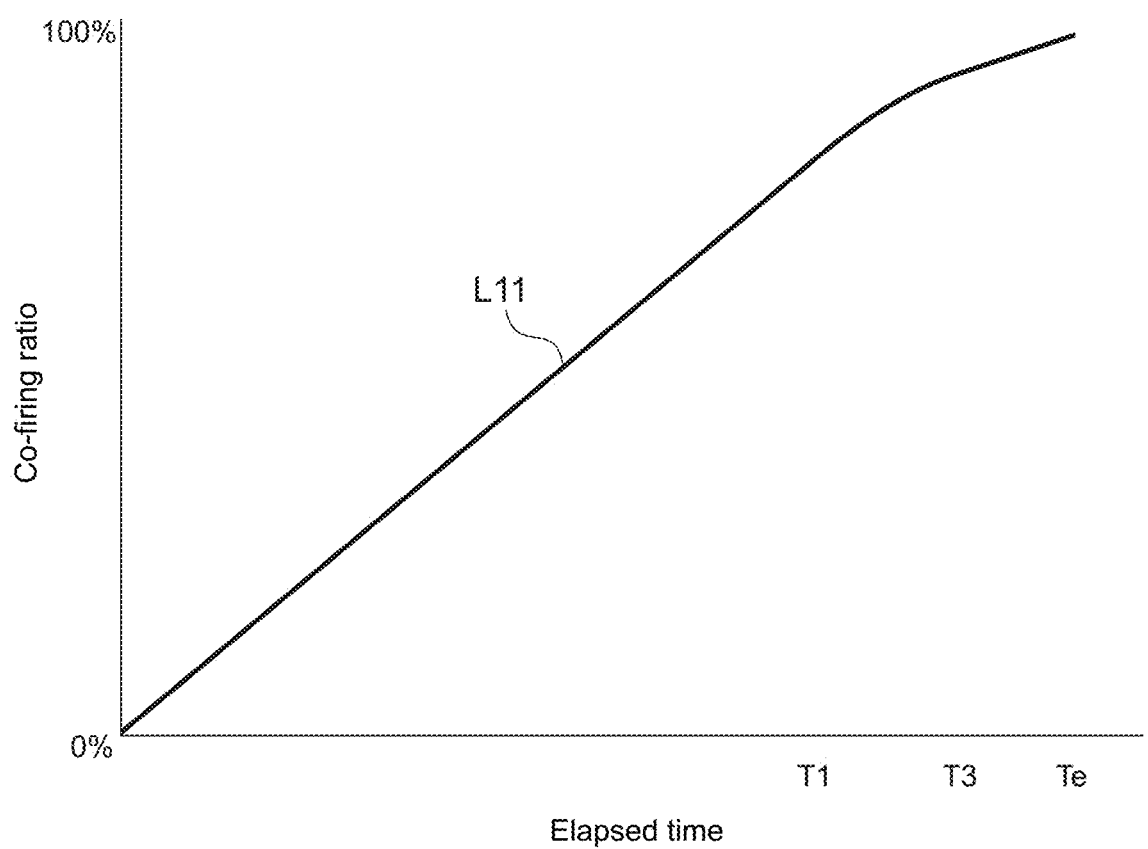
FIG. 6C is a graph showing a transition of the co-firing ratio during the execution of the step of increasing the co-firing ratio in the operation method for the gas turbine according to the third embodiment.

FIG. 6C is a graph showing a transition of the co-firing ratio during the execution of step S10 of increasing the co-firing ratio in the operation method for the gas turbine according to the third embodiment.

In an operation state where the co-firing ratio is relatively high, the combustion of ammonia which is the first fuel F1 tends to become unstable and the unburned fuel of the first fuel F1 tends to generated. In the operation state where the co-firing ratio is relatively high, if the increase rate of the co-firing ratio is relatively high, the combustion of ammonia which is the first fuel F1 becomes more unstable, which may result in the increase in concentration of the unburned fuel of the first fuel F1 in the combustion gas. Thus, in the operation state where the co-firing ratio is relatively high, it is desirable to relatively decrease the increase rate of the co-firing ratio.

Therefore, in the operation method for the gas turbine according to the third embodiment, in step S10 of increasing the co-firing ratio, the control device 100 controls each unit such that the increase rate of the co-firing ratio becomes a first increase rate, for example, if it is determined that the concentration of the unburned fuel does not exceed the specified concentration as before the elapse of the time T1, based on the information regarding the relationship between the turbine inlet temperature T1T and the co-firing ratio as shown in the graph of FIG. 3.

In the operation method for the gas turbine according to the third embodiment, in step S10 of increasing the co-firing ratio, the control device 100 controls each unit such that the increase rate of the co-firing ratio becomes a second increase rate less than the first increase rate, if it is determined that the concentration of the unburned fuel is about to exceed the specified concentration, based on the above-described information.

That is, in the operation method for the gas turbine according to the third embodiment, the fuel flow rate calculation unit 111 of the control device 100 calculates the flow rates of the first fuel F1 and the second fuel F2, which are supplied from the first fuel supply system 21 and the second fuel supply system 22 to the combustor 4, such that the increase rate of the co-firing ratio becomes the first increase rate, for example, while the turbine inlet temperature T1T is maintained at the temperature Ta, if it is determined that the concentration of the unburned fuel does not exceed the specified concentration. Then, the valve control signal output unit 112 of the control device 100 outputs the control signals to the actuators (not shown) of the first fuel flow control valve 23 and the second fuel flow control valve 25 such that the first fuel F1 and the second fuel F2 are supplied to the combustor 4 at the flow rates calculated by the fuel flow rate calculation unit 111.

Whereby, for example, in the region where the co-firing ratio is less than the value M1 in FIG. 3, as before the time T1 has elapsed in a graph line L10 of FIG. 6B and a graph line L11 of FIG. 6C, the co-firing ratio increases at the certain constant increase rate (first increase rate).

In the operation method for the gas turbine according to the third embodiment, the fuel flow rate calculation unit 111 of the control device 100 calculates the flow rates of the first fuel F1 and the second fuel F2, which are supplied from the first fuel supply system 21 and the second fuel supply system 22 to the combustor 4, such that the increase rate of the co-firing ratio becomes a second increase rate less than the first increase rate, for example, while the turbine inlet temperature T1T is maintained at the temperature Ta, if it is determined that the concentration of the unburned fuel is about to exceed the specified concentration. Then, the valve control signal output unit 112 of the control device 100 outputs the control signals to the actuators (not shown) of the first fuel flow control valve 23 and the second fuel flow control valve 25 such that the first fuel F1 and the second fuel F2 are supplied to the combustor 4 at the flow rates calculated by the fuel flow rate calculation unit 111.

Whereby, for example, in the region in FIG. 3, in which the co-firing ratio is greater than the value M1, as after the time T1 has elapsed in the graph line L10 of FIG. 6B and the graph line L11 of FIG. 6C, the co-firing ratio increases at the increase rate at which the increase rate of the co-firing ratio is less than that before the time T1 has elapsed.

In the operation method for the gas turbine according to the third embodiment, for example, in the region in FIG. 3, in which the co-firing ratio is greater than the value M1, the graph line L1 is present in the region to the lower right of the graph line L2, as indicated by a dashed line in FIG. 3. Therefore, when the co-firing ratio becomes greater than the value M1, the concentration of the unburned fuel (unburned ammonia concentration) gradually increases, as after the time T1 has elapsed in a graph line L9 in FIG. 6A.

However, by decreasing the increase rate of the co-firing ratio, the combustion of ammonia which is the first fuel F1 is less likely to become unstable as described above, and thus it is possible to reduce the increase in concentration of the unburned fuel compared to the case where the increase rate of the co-firing ratio is not decreased. Therefore, it is possible to prevent the concentration of the unburned fuel from exceeding the specified concentration, even if the unburned fuel is generated.

In the operation method for the gas turbine according to the third embodiment, after the time T1 has elapsed, the increase rate of the co-firing ratio is set to be less than that before the time T1 has elapsed. In this case, a lower limit value may be set for the increase rate of the co-firing ratio. That is, for example, as shown in FIG. 6B, after the time T1 has elapsed, the increase rate of the co-firing ratio may gradually be decreased until a time T3 has elapsed. Then, after the time T3 has elapsed, the co-firing ratio at the time of the elapse of the time T3 may be maintained until the time Te has elapsed (i.e., until the co-firing ratio reaches 100%).

Therefore, in the operation method for the gas turbine according to the third embodiment, in step S10 of increasing the co-firing ratio, the control device 100 may control each unit such that the increase rate of the co-firing ratio becomes the second increase rate which is less than the first increase rate and is not less than the predetermined lower limit value, if it is determined that the concentration of the unburned fuel is about to exceed the specified concentration, based on the information regarding the relationship between the turbine inlet temperature T1T and the co-firing ratio as shown in the graph of FIG. 3.

Whereby, it is possible to increase the co-firing ratio in the relatively short time while reducing the increase in amount of the unburned fuel generated.

The above-described lower limit value is preferably a positive value. Whereby, it is possible to increase the co-firing ratio in a relatively short time while reducing the increase in amount of the unburned fuel generated.

The above-described lower limit value may be a negative value. That is, the increase rate of the co-firing ratio may be the negative value. Whereby, although it will take some time to bring the co-firing ratio closer to 100%, it is possible to further reduce the increase in amount of the unburned fuel generated.

As described above, the increase rate of the co-firing ratio may be made negative, that is, the increase rate of the supply amount of the first fuel F1 may temporarily be made greater than the increase rate of the supply amount of the second fuel F2. For example, in a case where it is difficult to reduce emission of the unburned fuel, the amount of the unburned fuel generated can be reduced by operating the fuel system 20 so as to temporarily decrease the co-firing ratio.

As to Operation Method for Gas Turbine in Fourth Embodiment

In the operation methods for the gas turbine according to the first embodiment to the third embodiment described above, in step S10 of increasing the co-firing ratio, the process is performed without using the concentration sensor 9 for detecting the concentration of ammonia in the combustion gas.

In the operation method for the gas turbine according to the fourth embodiment, the process is performed by using the concentration sensor 9 in step S10 of increasing the co-firing ratio.

Specifically, in the operation method for the gas turbine according to the fourth embodiment, in step S10 of increasing the co-firing ratio, the control device 100 refers to a detected value of the concentration of ammonia in the combustion gas by the concentration sensor 9 when the control device 100 determines that the concentration of the unburned fuel does not exceed the specified concentration and when the control device 100 determines that the concentration of the unburned fuel is about to exceed the specified concentration.

For example, if the concentration sensor 9 cannot detect ammonia, the control device 100 may determine that the concentration of the unburned fuel does not exceed the specified concentration. Further, for example, if the detected value of ammonia by the concentration sensor 9 exceeds a predetermined threshold, the control device 100 may determine that the concentration of the unburned fuel is about to exceed the specified concentration.

Moreover, for example, in the control for changing the increase speed Sam of the flow rate of the first fuel F1 or the control for changing the decrease speed Sng of the flow rate of the second fuel F2 in the first embodiment described above, feedback control based on the detected value of ammonia by the concentration sensor 9 may be performed.

For example, when the opening degree of the inlet guide vane 6 is changed in the second embodiment described above, feedback control based on the detected value of ammonia by the concentration sensor 9 may be performed.

For example, when the increase rate of the co-firing ratio is changed in the third embodiment described above, feedback control based on the detected value of ammonia by the concentration sensor 9 may be performed.

As described above, in the operation method for the gas turbine according to the fourth embodiment, in step S10 of increasing the co-firing ratio, the control device 100 changes at least either of the turbine inlet temperature T1T or the change rate of the co-firing ratio, if the control device 100 determines that the concentration has increased, based on the concentration of the unburned fuel of the first fuel F1 in the combustion gas, which is detected by the concentration sensor 9.

Whereby, it is possible to reduce the increase in amount of the unburned fuel generated.

The present disclosure is not limited to the above-described embodiments, and also includes an embodiment obtained by modifying the above-described embodiments or an embodiment obtained by combining these embodiments as appropriate.

By gradually increasing the co-firing ratio by increasing the first fuel F1 while decreasing the second fuel F2, a combustion field is formed in which flame stabilization is possible with only the first fuel F1 (independent flame stabilization by the first fuel F1 is possible) at a certain point in time.

Therefore, a timing to start changing at least either of the turbine inlet temperature T1T or the change rate of the co-firing ratio in the process of increasing the co-firing ratio may be after the point in time when flame stabilization is possible with only the first fuel F1, as described above. Whereby, since stable combustion is possible with only the first fuel F1, a possibility of misfire is low, and it is easy to make change in condition, such as the change in the turbine inlet temperature T1T or the change in the change rate of the co-firing ratio.

The contents described in the above embodiments would be understood as follows, for instance.

(1) An operation method for a gas turbine according to at least one embodiment of the present disclosure is an operation method for a gas turbine 2, including: a step S10 of increasing a co-firing ratio of first fuel F1 the co-firing ratio of which is to be increased and second fuel F2 different from the first fuel F1. The step S10 of increasing the co-firing ratio includes changing at least either of a turbine inlet temperature T1T or a change rate of the co-firing ratio based on information regarding a relationship between the turbine inlet temperature T1T and the above-described co-firing ratio.

As a result of intensive studies by the present inventors, it was found that if an increase in amount of the unburned fuel generated is expected in the process of increasing the above-described co-firing ratio, the increase in amount of the unburned fuel generated can be reduced by changing the turbine inlet temperature T1T or changing the change rate of the above-described co-firing ratio.

According to the above method (1), it is possible to reduce the increase in amount of the unburned fuel generated.

(2) In some embodiments, in the above method (1), the above-described information is preferably information regarding a relationship among the turbine inlet temperature T1T, the above-described co-firing ratio, and a concentration of unburned fuel of the first fuel F1 in a combustion gas.

As a result of intensive studies by the present inventors, it was found that the relationship between the turbine inlet temperature T1T and the above-described co-firing ratio influences the concentration of the unburned fuel of the first fuel F1 in the combustion gas.

According to the above method (2), the increase in amount of the unburned fuel generated can be reduced by changing at least either of the turbine inlet temperature T1T or the change rate of the above-described co-firing ratio based on the above-described information.

(3) In some embodiments, in the above method (2), the step S10 of increasing the co-firing ratio preferably includes changing the turbine inlet temperature T1T so that the concentration of the unburned fuel in the combustion gas does not exceed a specified concentration, based on the above-described information.

According to the above method (3), it is possible to prevent the concentration of the unburned fuel in the combustion gas from exceeding the specified concentration, by changing the turbine inlet temperature T1T.

(4) In some embodiments, in the above method (3), the step S10 of increasing the co-firing ratio preferably includes controlling the turbine inlet temperature T1T such that the turbine inlet temperature T1T becomes a first temperature, if it is determined that the concentration of the unburned fuel does not exceed the specified concentration, based on the above-described information. The step S10 of increasing the co-firing ratio preferably includes controlling the turbine inlet temperature T1T such that the turbine inlet temperature T1T becomes a second temperature higher than the first temperature, if it is determined that the concentration of the unburned fuel is about to exceed the specified concentration, based on the above-described information.

According to the above method (4), it is possible to prevent the concentration of the unburned fuel in the combustion gas from exceeding the specified concentration, by increasing the turbine inlet temperature T1T.

(5) In some embodiments, in the above method (4), the step S10 of increasing the co-firing ratio preferably includes setting an increase speed Sam of a flow rate of the first fuel F1 to a first increase speed Sam1 such that the turbine inlet temperature T1T becomes the first temperature, if it is determined that the concentration of the unburned fuel does not exceed the specified concentration, based on the above-described information. The step S10 of increasing the co-firing ratio preferably includes setting the increase speed Sam of the flow rate of the first fuel F1 to a second increase speed Sam2 greater than the first increase speed Sam1 such that the turbine inlet temperature T1T becomes the second temperature, if it is determined that the concentration of the unburned fuel is about to exceed the specified concentration, based on the above-described information.

According to the above method (5), it is possible to prevent the concentration of the unburned fuel in the combustion gas from exceeding the specified concentration, by increasing the increase speed Sam of the flow rate of the first fuel F1.

(6) In some embodiments, in the above method (4) or (5), the step S10 of increasing the co-firing ratio preferably includes setting a decrease speed Sng of a flow rate of the second fuel F2 to a first decrease speed Sng1 such that the turbine inlet temperature T1T becomes the first temperature, if it is determined that the concentration of the unburned fuel does not exceed the specified concentration, based on the above-described information. The step S10 of increasing the co-firing ratio preferably includes setting the decrease speed Sng of the flow rate of the second fuel F2 to a second decrease speed Sng2 less than the first decrease speed Sng1 such that the turbine inlet temperature T1T becomes the second temperature, if it is determined that the concentration of the unburned fuel is about to exceed the specified concentration, based on the above-described information.

According to the above method (6), it is possible to prevent the concentration of the unburned fuel in the combustion gas from exceeding the specified concentration, by decreasing the decrease speed Sng of the flow rate of the second fuel F2.

(7) In some embodiments, in the above method (4), the step S10 of increasing the co-firing ratio preferably includes setting an increase speed Sam of a flow rate of the first fuel F1 to a first increase speed Sam1 and setting a decrease speed Sng of a flow rate of the second fuel F2 to a first decrease speed Sng1 such that the turbine inlet temperature T1T becomes the first temperature while the change rate of the co-firing ratio is maintained at a first change rate, if it is determined that the concentration of the unburned fuel does not exceed the specified concentration, based on the above-described information. The step S10 of increasing the co-firing ratio preferably includes setting the increase speed Sam of the flow rate of the first fuel F1 to a second increase speed Sam2 greater than the first increase speed Sam1 and setting the decrease speed Sng of the flow rate of the second fuel F2 to a second decrease speed Sng2 less than the first decrease speed Sng1 such that the turbine inlet temperature T1T becomes the second temperature while the change rate of the co-firing ratio is maintained at the first change rate, if it is determined that the concentration of the unburned fuel is about to exceed the specified concentration, based on the above-described information.

According to the above method (7), it is possible to prevent the concentration of the unburned fuel in the combustion gas from exceeding the specified concentration without changing the change rate of the co-firing ratio.

(8) In some embodiments, in the above method (4), the gas turbine 2 includes a compressor (compressor 3) for supplying compressed air to a turbine 5, and an inlet guide vane 6 for controlling a flow rate of air supplied to the compressor (compressor 3). The step S10 of increasing the co-firing ratio preferably includes setting an opening degree of the inlet guide vane 6 to a first opening degree such that the turbine inlet temperature T1T becomes the first temperature, if it is determined that the concentration of the unburned fuel does not exceed the specified concentration, based on the above-described information. The step S10 of increasing the co-firing ratio preferably includes setting the opening degree of the inlet guide vane 6 to a second opening degree less than the first opening degree such that the turbine inlet temperature T1T becomes the second temperature, if it is determined that the concentration of the unburned fuel is about to exceed the specified concentration, based on the above-described information.

According to the above method (8), it is possible to prevent the concentration of the unburned fuel in the combustion gas from exceeding the specified concentration by changing the opening degree of the inlet guide vane 6.

(9) In some embodiments, in the above method (4), the gas turbine 2 includes a compressor (compressor 3) for supplying compressed air to a turbine 5, an extracted air line 13 for extracting air from the compressor (compressor 3), and a control valve (extracted air flow control valve 27) for controlling a flow rate of the compressed air flowing in the extracted air line 13. The step S10 of increasing the co-firing ratio preferably includes setting an opening degree of the control valve (extracted air flow control valve 27) to a first opening degree such that the turbine inlet temperature T1T becomes the first temperature, if it is determined that the concentration of the unburned fuel does not exceed the specified concentration, based on the above-described information. The step S10 of increasing the co-firing ratio preferably includes setting the opening degree of the control valve (extracted air flow control valve 27) to a second opening degree greater than the first opening degree such that the turbine inlet temperature T1T becomes the second temperature, if it is determined that the concentration of the unburned fuel is about to exceed the specified concentration, based on the above-described information.

According to the above method (9), it is possible to prevent the concentration of the unburned fuel in the combustion gas from exceeding the specified concentration by changing the opening degree of the control valve (extracted air flow control valve 27).

(10) In some embodiments, in any of the above methods (3) to (9), the step S10 of increasing the co-firing ratio preferably includes setting an increase rate of the co-firing ratio to a first increase rate, if it is determined that the concentration of the unburned fuel does not exceed the specified concentration, based on the above-described information. The step S10 of increasing the co-firing ratio preferably includes setting the increase rate of the co-firing ratio to a second increase rate less than the first increase rate, if it is determined that the concentration of the unburned fuel is about to exceed the specified concentration, based on the above-described information.

According to the above method (10), by decreasing the increase rate of the co-firing ratio when the concentration of the unburned fuel of the first fuel F1 in the combustion gas is expected to exceed the specified concentration, the increase in concentration of the unburned fuel of the first fuel F1 in the combustion gas can be reduced compared to a case where the increase rate of the co-firing ratio is not decreased.

(11) In some embodiments, in the above method (10), the step S10 of increasing the co-firing ratio preferably includes setting the increase rate of the co-firing ratio to a second increase rate which is less than the first increase rate and is not less than a predetermined lower limit value, if it is determined that the concentration of the unburned fuel is about to exceed the specified concentration, based on the above-described information.

According to the above method (11), it is possible to increase the co-firing ratio in a relatively short time while reducing the increase in amount of the unburned fuel generated.

(12) In some embodiments, in the above method (11), the step S10 of increasing the co-firing ratio preferably includes setting the increase rate of the co-firing ratio to a second increase rate which is less than the first increase rate and is a positive value not less than the predetermined lower limit value, if it is determined that the concentration of the unburned fuel is about to exceed the specified concentration, based on the above-described information.

According to the above method (12), it is possible to increase the co-firing ratio in the relatively short time while reducing the increase in amount of the unburned fuel generated.

(13) In some embodiments, in the above method (11), the step S10 of increasing the co-firing ratio preferably includes setting the increase rate of the co-firing ratio to a second increase rate which is less than the first increase rate and is a negative value not less than the predetermined lower limit value, if it is determined that the concentration of the unburned fuel is about to exceed the specified concentration, based on the above-described information.

According to the above method (13), although it will take some time to increase the co-firing ratio, it is possible to further reduce the increase in amount of the unburned fuel generated.

(14) In some embodiments, in any of the above methods (2) to (13), the above-described information may be a map representing the relationship among the turbine inlet temperature T1T, the co-firing ratio, and the concentration of the unburned fuel.

According to the above method (14), it is relatively easy to control the turbine inlet temperature T1T or the change rate of the co-firing ratio.

(15) In some embodiments, in the above method (14), the step S10 of increasing the co-firing ratio preferably includes changing the turbine inlet temperature T1T not to enter a region where the concentration of the unburned fuel is relatively high, which is preset in the above-described map.

According to the above method (15), it is possible to reduce the increase in amount of the unburned fuel generated.

(16) An operation method for a gas turbine according to at least one embodiment of the present disclosure is an operation method for a gas turbine 2, including: a step S10 of increasing a co-firing ratio of first fuel F1 the co-firing ratio of which is to be increased and second fuel F2 different from the first fuel F1. The gas turbine 2 includes a sensor (concentration sensor 9) for detecting unburned fuel of the first fuel F1 in a combustion gas. The step S10 of increasing the co-firing ratio includes changing at least either of a turbine inlet temperature T1T or a change rate of the co-firing ratio, if it is determined that a concentration of the unburned fuel of the first fuel F1 in the combustion gas, which is detected by the above-described sensor (concentration sensor 9), has increased, based on the concentration.

According to the above method (16), it is possible to reduce the increase in amount of the unburned fuel generated.

(17) A control device 100 for a gas turbine according to at least one embodiment of the present disclosure is a control device for a gas turbine 2, including: a co-firing ratio control unit 110 configured to increase a co-firing ratio of first fuel F1 the co-firing ratio of which is to be increased and second fuel F2 different from the first fuel F1. The co-firing ratio control unit 110 is configured to change at least either of a turbine inlet temperature T1T or a change rate of the co-firing ratio based on information regarding a relationship between the turbine inlet temperature T1T and the co-firing ratio, when the above-described co-firing ratio is increased.

According to the above configuration (17), it is possible to reduce the increase in amount of the unburned fuel generated.

The invention claimed is:

1. An operation method for a gas turbine, comprising:
   a step of increasing a co-firing ratio of first fuel supplied from a first fuel supply source, the co-firing ratio of which is to be increased and second fuel supplied from a second fuel supply source different from the first fuel supply source and including fuel component different from the first fuel,
   wherein the step of increasing the co-firing ratio includes changing at least either of a turbine inlet temperature or a change rate of the co-firing ratio based on information regarding a relationship between the turbine inlet temperature and the co-firing ratio.

2. The operation method for the gas turbine according to claim 1,
   wherein the information is information regarding a relationship among the turbine inlet temperature, the co-firing ratio, and a concentration of unburned fuel of the first fuel in a combustion gas.

3. The operation method for the gas turbine according to claim 2,
   wherein the step of increasing the co-firing ratio includes changing the turbine inlet temperature so that the concentration of the unburned fuel in the combustion gas does not exceed a specified concentration, based on the information.

4. The operation method for the gas turbine according to claim 3,
   wherein the step of increasing the co-firing ratio includes:
      controlling the turbine inlet temperature such that the turbine inlet temperature becomes a first temperature, if it is determined that the concentration of the unburned fuel does not exceed the specified concentration, based on the information; and
      controlling the turbine inlet temperature such that the turbine inlet temperature becomes a second temperature higher than the first temperature, if it is determined that the concentration of the unburned fuel is about to exceed the specified concentration, based on the information.

5. The operation method for the gas turbine according to claim 4,
   wherein the step of increasing the co-firing ratio includes:
      setting an increase speed of a flow rate of the first fuel to a first increase speed such that the turbine inlet temperature becomes the first temperature, if it is determined that the concentration of the unburned fuel does not exceed the specified concentration, based on the information; and
      setting the increase speed of the flow rate of the first fuel to a second increase speed greater than the first increase speed such that the turbine inlet temperature becomes the second temperature, if it is determined that the concentration of the unburned fuel is about to exceed the specified concentration, based on the information.

6. The operation method for the gas turbine according to claim 4,
   wherein the step of increasing the co-firing ratio includes:
      setting a decrease speed of a flow rate of the second fuel to a first decrease speed such that the turbine inlet temperature becomes the first temperature, if it is determined that the concentration of the unburned fuel does not exceed the specified concentration, based on the information; and
      setting the decrease speed of the flow rate of the second fuel to a second decrease speed less than the first decrease speed such that the turbine inlet temperature becomes the second temperature, if it is determined that the concentration of the unburned fuel is about to exceed the specified concentration, based on the information.

7. The operation method for the gas turbine according to claim 4,
   wherein the step of increasing the co-firing ratio includes:
      setting an increase speed of a flow rate of the first fuel to a first increase speed and setting a decrease speed of a flow rate of the second fuel to a first decrease speed such that the turbine inlet temperature becomes the first temperature while the change rate of the co-firing ratio is maintained at a first change rate, if it is determined that the concentration of the unburned fuel does not exceed the specified concentration, based on the information; and
      setting the increase speed of the flow rate of the first fuel to a second increase speed greater than the first increase speed and setting the decrease speed of the flow rate of the second fuel to a second decrease speed less than the first decrease speed such that the turbine inlet temperature becomes the second temperature while the change rate of the co-firing ratio is maintained at the first change rate, if it is determined that the concentration of the unburned fuel is about to exceed the specified concentration, based on the information.

8. The operation method for the gas turbine according to claim 4,
wherein the gas turbine includes a compressor for supplying compressed air to a turbine, and an inlet guide vane for controlling a flow rate of air supplied to the compressor, and
wherein the step of increasing the co-firing ratio includes:
setting an opening degree of the inlet guide vane to a first opening degree such that the turbine inlet temperature becomes the first temperature, if it is determined that the concentration of the unburned fuel does not exceed the specified concentration, based on the information; and
setting the opening degree of the inlet guide vane to a second opening degree less than the first opening degree such that the turbine inlet temperature becomes the second temperature, if it is determined that the concentration of the unburned fuel is about to exceed the specified concentration, based on the information.

9. The operation method for the gas turbine according to claim 4,
wherein the gas turbine includes a compressor for supplying compressed air to a turbine, an extracted air line for extracting air from the compressor, and a control valve for controlling a flow rate of the compressed air flowing in the extracted air line, and
wherein the step of increasing the co-firing ratio includes:
setting an opening degree of the control valve to a first opening degree such that the turbine inlet temperature becomes the first temperature, if it is determined that the concentration of the unburned fuel does not exceed the specified concentration, based on the information; and
setting the opening degree of the control valve to a second opening degree greater than the first opening degree such that the turbine inlet temperature becomes the second temperature, if it is determined that the concentration of the unburned fuel is about to exceed the specified concentration, based on the information.

10. The operation method for the gas turbine according to claim 3,
wherein the step of increasing the co-firing ratio includes:
setting an increase rate of the co-firing ratio to a first increase rate, if it is determined that the concentration of the unburned fuel does not exceed the specified concentration, based on the information; and
setting the increase rate of the co-firing ratio to a second increase rate less than the first increase rate, if it is determined that the concentration of the unburned fuel is about to exceed the specified concentration, based on the information.

11. The operation method for the gas turbine according to claim 10,
wherein the step of increasing the co-firing ratio includes setting the increase rate of the co-firing ratio to a second increase rate which is less than the first increase rate and is not less than a predetermined lower limit value, if it is determined that the concentration of the unburned fuel is about to exceed the specified concentration, based on the information.

12. The operation method for the gas turbine according to claim 11,
wherein the step of increasing the co-firing ratio includes setting the increase rate of the co-firing ratio to a second increase rate which is less than the first increase rate and is a positive value not less than the predetermined lower limit value, if it is determined that the concentration of the unburned fuel is about to exceed the specified concentration, based on the information.

13. The operation method for the gas turbine according to claim 11,
wherein the step of increasing the co-firing ratio includes setting the increase rate of the co-firing ratio to a second increase rate which is less than the first increase rate and is a negative value not less than the predetermined lower limit value, if it is determined that the concentration of the unburned fuel is about to exceed the specified concentration, based on the information.

14. The operation method for the gas turbine according to claim 2,
wherein the information is a map representing the relationship among the turbine inlet temperature, the co-firing ratio, and the concentration of the unburned fuel.

15. The operation method for the gas turbine according to claim 14,
wherein the step of increasing the co-firing ratio includes changing the turbine inlet temperature not to enter a region where the concentration of the unburned fuel is relatively high, which is preset in the map.

16. An operation method for a gas turbine, comprising:
a step of increasing a co-firing ratio of first fuel supplied from a first supply source, the co-firing ratio of which is to be increased and second fuel supplied from a second fuel supply source different from the first fuel supply source and including fuel component different from the first fuel,
wherein the gas turbine includes a sensor for detecting unburned fuel of the first fuel in a combustion gas, and
wherein the step of increasing the co-firing ratio includes changing at least either of a turbine inlet temperature or a change rate of the co-firing ratio, if it is determined that a concentration of the unburned fuel of the first fuel in the combustion gas, which is detected by the sensor, has increased, based on the concentration.

17. A control device for a gas turbine, comprising:
a co-firing ratio control unit configured to increase a co-firing ratio of first fuel supplied from a first fuel supply source, the co-firing ratio of which is to be increased and second fuel supplied from a second fuel supply source different from the first fuel supply source and including fuel component different from the first fuel,
wherein the co-firing ratio control unit is configured to change at least either of a turbine inlet temperature or a change rate of the co-firing ratio based on information regarding a relationship between the turbine inlet temperature and the co-firing ratio, when the co-firing ratio is increased.

18. The operation method for the gas turbine according to claim 1,
wherein the first fuel is ammonia,
wherein the second fuel is natural gas.

19. The operation method for the gas turbine according to claim 16,
wherein the first fuel is ammonia,
wherein the second fuel is natural gas.

20. The control device for the gas turbine according to claim 17,
wherein the first fuel is ammonia,
wherein the second fuel is natural gas.

* * * * *